United States Patent
Hu et al.

(10) Patent No.: US 9,870,872 B2
(45) Date of Patent: Jan. 16, 2018

(54) ASYMMETRIC ELECTRICAL DOUBLE-LAYER CAPACITOR USING ELECTROCHEMICAL ACTIVATED CARBON

(71) Applicants: NATIONAL TSING HUA UNIVERSITY, Hsinchu (TW); DELTA ELECTRONICS, INC., Taoyuan (TW)

(72) Inventors: Chi-Chang Hu, Taoyuan (TW); Hsiao-Hsuan Shen, Taoyuan (TW)

(73) Assignees: NATIONAL TSING HUA UNIVERSITY, Hsinchu (TW); DELTA ELECTRONICS, INC., Taoyuan (TW)

( * ) Notice: Subject to any disclaimer, the term of this patent is extended or adjusted under 35 U.S.C. 154(b) by 121 days.

(21) Appl. No.: 14/983,473

(22) Filed: Dec. 29, 2015

(65) Prior Publication Data

US 2017/0186560 A1   Jun. 29, 2017

(51) Int. Cl.
*H01G 11/32* (2013.01)
*H01G 11/34* (2013.01)
*H02J 7/00* (2006.01)

(52) U.S. Cl.
CPC .............. *H01G 11/34* (2013.01); *H02J 7/007* (2013.01)

(58) Field of Classification Search
CPC ....................................................... H01G 11/32
See application file for complete search history.

(56) References Cited

U.S. PATENT DOCUMENTS

| 7,923,157 B2 * | 4/2011 | Kim ...................... H01M 4/587 252/62.2 |
| 2002/0039275 A1 | 4/2002 | Takeuchi et al. |

OTHER PUBLICATIONS

C. Zheng et al., "A 4 V-electrochemical capacitor using electrode and electrolyte materials free of metals", Journal of Power Sources, 2014, pp. 19-26.
Makoto Ue et al, "Electrochemical Properties of Organic Liquid Electrolytes Based on Quaternary Onium Salts for Electrical Double-Layer Capacitors", J. Electrochem. Soc., vol. 141, No. 11, Nov. 1994.
Katsuhiko Naoi et al, "Second generation 'nanohybrid supercapacitor': Evolution of capacitive energy storage devices", Energy &Environmental Science, 2012, pp. 9363-9373.
Michio Okamura, "Introducing the "Nanogate" Capacitor", IEEE Power Electronics Society Newsletter, First Quarter 2004 ,vol. 16, No. 1, pp. 9-10.
M. J. Matthews et al., "Origin of dispersive effects of the Raman D band in carbon materials", The American Physical Society, vol. 59, No. 10, R6585-R6588.
H. Wang et al., "From symmetric AC/AC to asymmetric AC/graphite, a progress in electrochemical capacitors", Journal of Power Sources, 2007, pp. 375-380.

\* cited by examiner

*Primary Examiner* — Eric Thomas
(74) *Attorney, Agent, or Firm* — CKC & Partners Co., Ltd.

(57) ABSTRACT

An asymmetric supercapacitor includes a negative electrode made of a first carbon, a positive electrode made of a soft carbon, a separator and an electrolyte. The separator is disposed in between the negative and positive electrodes. The soft carbon has an activation threshold (AT) larger than 1400, and the activation threshold (AT) is obtained from the following formula: $AT=L_a*(A_a/A_c)$. $L_a$ is an in-plane correlation length of the soft carbon, $A_a$ is an area of amorphous peak of the soft carbon analysed by X-ray diffraction in Gaussian distribution graph, and $A_c$ is an area of crystalline peak of the soft carbon analysed by X-ray diffraction in Gaussian distribution graph.

6 Claims, 9 Drawing Sheets

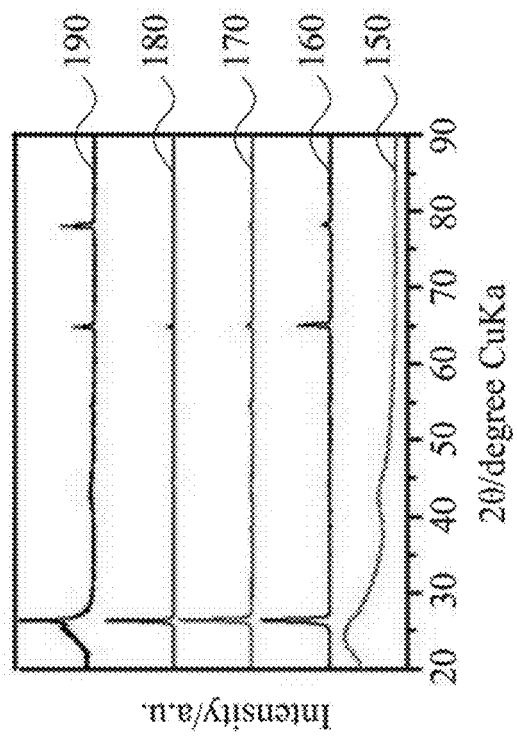
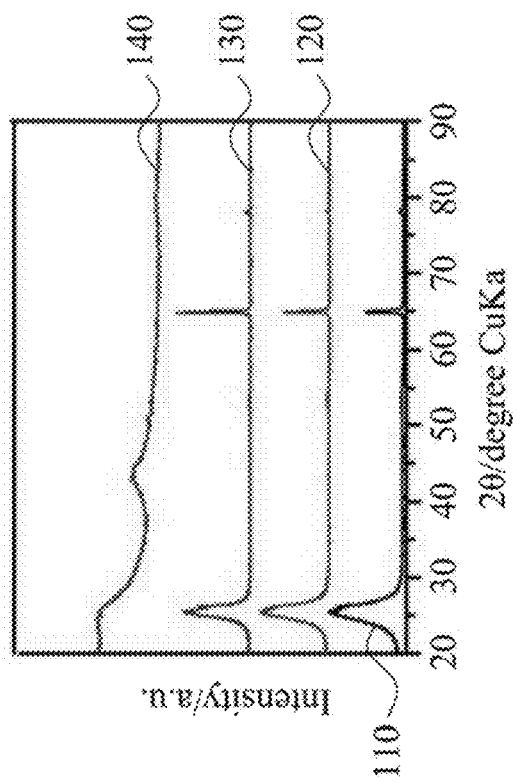
Fig. 2A
Fig. 2B

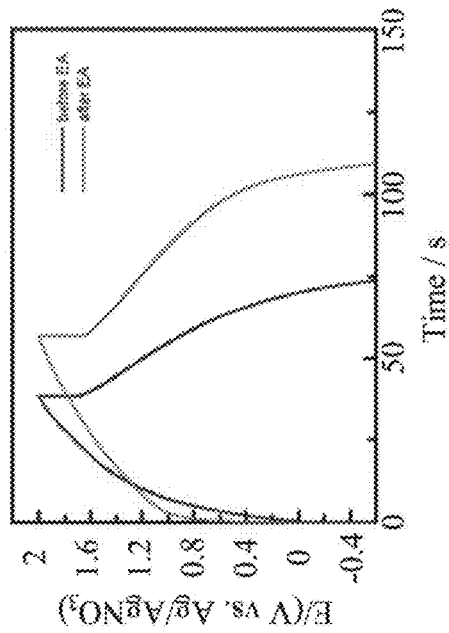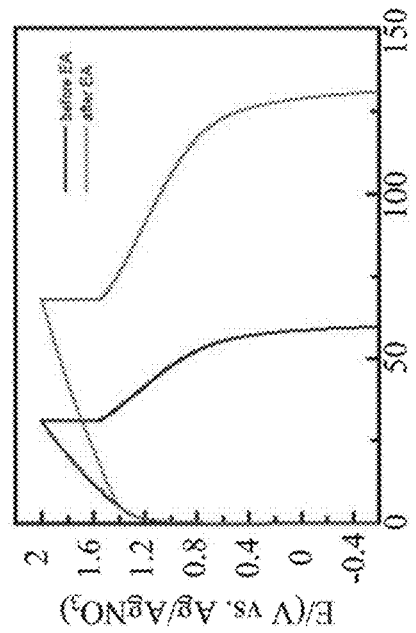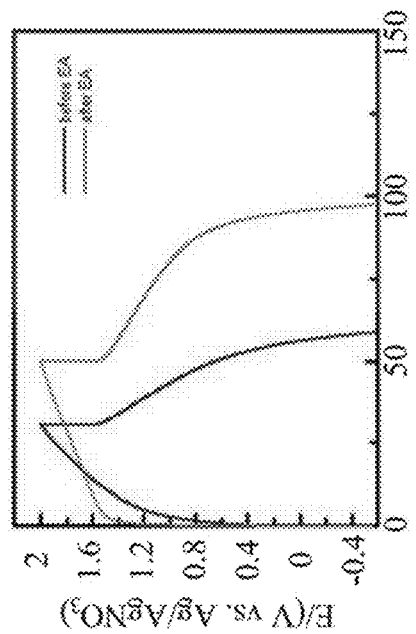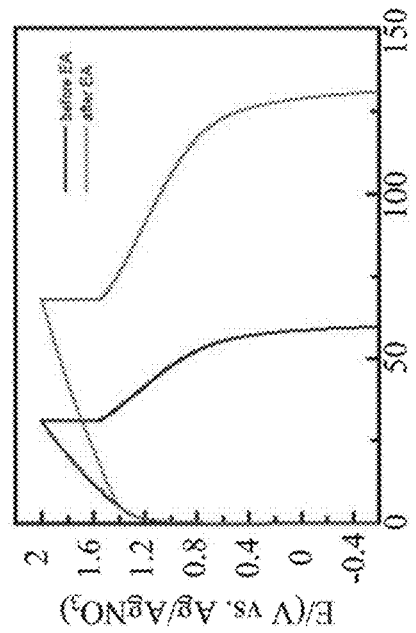
Fig. 7
Fig. 8A
Fig. 8B
Fig. 8C

ASYMMETRIC ELECTRICAL DOUBLE-LAYER CAPACITOR USING ELECTROCHEMICAL ACTIVATED CARBON

BACKGROUND

Field of Invention

The present invention relates to a supercapacitor. More particularly, the present invention relates to a supercapacitor using soft carbon as one of the electrode.

Description of Related Art

Electrochemical capacitor, also known as supercapacitor, is capable of stable charging or discharging at high speed. It is a high power energy storage component. Supercapacitor is well developed, and according to its storage mechanism, it is divided into three types. They are electrical double-layer capacitors (EDLCs), pseudo capacitor and asymmetric supercapacitor. EDLC uses the ion absorption and detaching in the electrolyte to generate power. Pseudo capacitor generates power from redox reaction. Asymmetric super capacitor uses at least two different types of mechanisms in one assembly to generate power. Energy density is the key to the development of electrochemical capacitor. According to energy density equation $E=\frac{1}{2}CV^2$ (C is cell capacitance; V is cell voltage), there are two approaches to increase energy density. One way to increase energy density is to increase the cell capacitance, and the other way is to increase its cell voltage. A lot of time has been invested in manipulating the cell voltage so as to obtain an elevated energy density.

In order to increase cell voltage, a variety of organic electrolyte is used. Common organic electrolyte solvent includes propylene carbonate (PC), acetonitrile (AN), γ-butyrolactone (GBL) or the like. Solute may include, for example, tetraethylammonium tetrafluoroborate ($TEABF_4$) and tetraethylammonium hexafluorophosphate ($TEAPF_6$). It is found an electrolyte having the combination of PC and $TEABF_4$ gives relatively high capacitance (dielectric coefficient).

In recent research, it is found that activated carbon could elevate capacitance to a great extent because of its porous structure and large surface area. The application of activated carbon in capacitor is heavily studied due to its unique electrochemical property. However, the porous structure retains a lot of water. In organic capacitor, water molecule facilitates decomposition of the organic electrolyte, leading to excessive gas production. Accumulative gas in the chamber results in surging pressure, and eventually the damage to the electrodes. Therefore, if activated carbon is used for negative and positive electrodes in a capacitor, the capacitor usually works under 2.5-2.7 V, or the device is prone to instable performance.

When using activated carbon as the positive electrode and graphene or Li-containing compound as the negative electrode, for example ($Li_4Ti_5O_{12}$, LTO), the cell voltage should rise to 4.3 V. However, Li ions has low diffusion rate and poor conductivity, the power density is low, and therefore its empirical cell voltage is 3-4 V, which is lower than expected. Furthermore, in this type of Li-ion capacitor, solid-electrolyte interphase (SEI) is omitted for safety concern, and the minimum cell voltage in respect to $Li/Li^+$ has to exceed 1.55 V. As a result, the actually remaining cell voltage is only approximately 2.45 V.

Therefore, there is an urgent call to provide a stable supercapacitor using carbon as the primary material and having a stable and high cell voltage.

SUMMARY

The instant disclosure provides an energy storage device using an asymmetric electrical double-layer capacitor (EDLC) having a higher and stable cell voltage and therefore a higher energy density. As previously discussed, cell voltage determines the applicable fields of a capacitor and a higher cell voltage is greatly desired. The asymmetric EDLC uses activated carbon and treated soft carbon where less gas emission and much higher capacitance are observed.

In one aspect of the instant disclosure a supercapacitor is provided. The supercapacitor includes a negative electrode made of a first carbon, a positive electrode made of a treated soft carbon, a separator and an electrolyte. The separator is disposed in between the negative and positive electrodes. The treated soft carbon has an activation threshold (AT) larger than 1400, and the activation threshold (AT) is obtained from the following formula: $AT=L_a*(A_a/A_c)$. $L_a$ is an in-plane correlation length of the treated soft carbon, $A_a$ is an area of amorphous peak of the treated soft carbonnalysed by X-ray diffraction in Gaussian distribution graph, and $A_c$ is an area of crystalline peak of the treated soft carbonnalysed by X-ray diffraction in Gaussian distribution graph.

In another aspect of the instant disclosure, a method of modifying carbons a positive electrode in a supercapacitor is provided. The method includes treating the carbon by cyclic voltammetry and treating the carbon by charging-discharging cycles.

The treated soft carbon helps stabilize the device and at the same time provide higher capacitance because of its degree of graphitisation and the treatment of electrochemical activation. The combination of double-layer type carbon and treated soft carbon allows the battery to be charged and, in turn, deliver stored energy at a high power rating than conventional rechargeable battery.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIGS. 2A-2B are X-ray diffraction graphs showing different samples between 20° and 90°;

FIG. 7 is a graph showing before and after cyclic voltammetric scan cycle of nanographite particles;

FIGS. 8A-8C are before and after charging-discharging at 1 A/g line graphs of soft carbon respectively.

DETAILED DESCRIPTION

Figure 1:
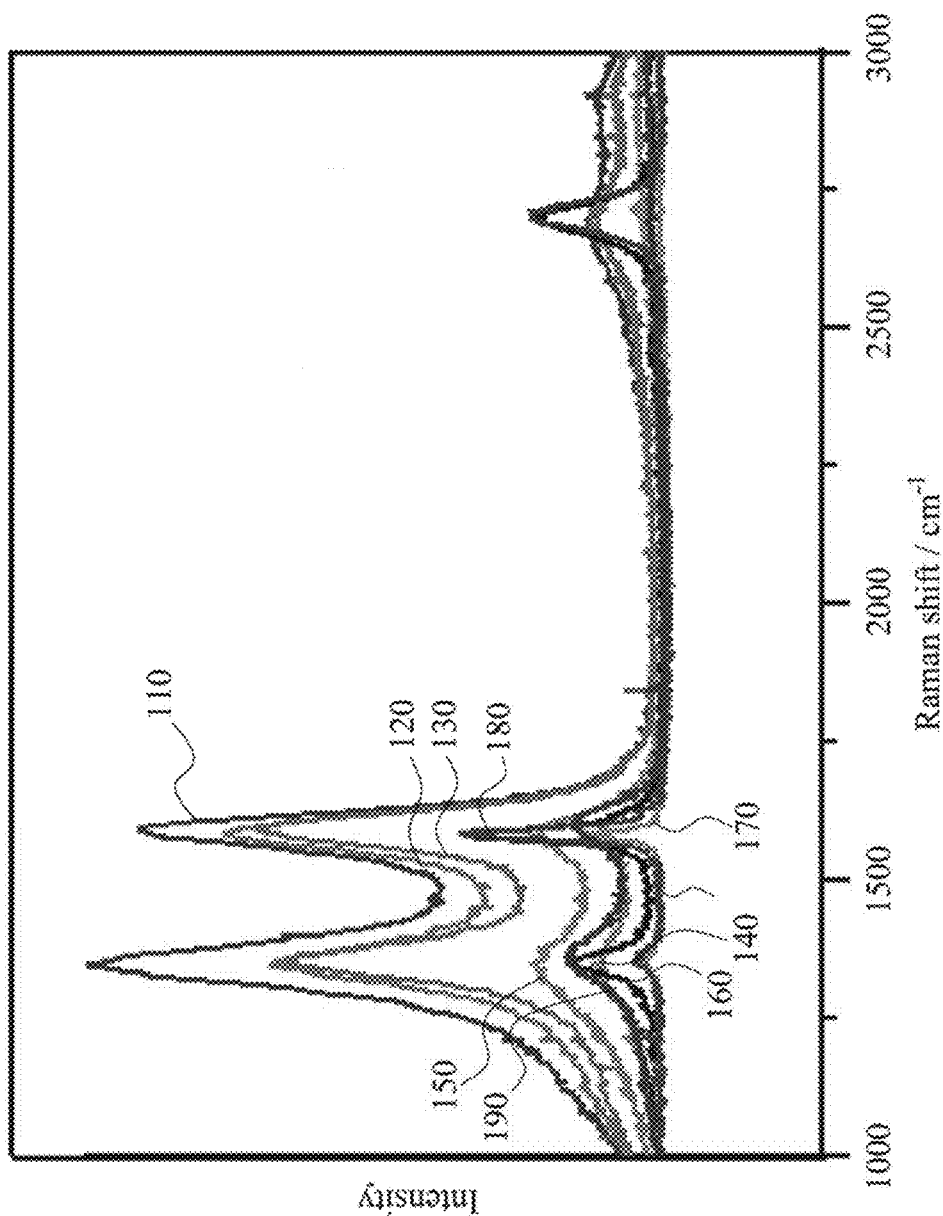
FIG. 1 is a line graph showing different samples under Raman shift spectrum test.

Reference will now be made in detail to the present embodiments of the invention, examples of which are illustrated in the accompanying drawings. Wherever possible, the same reference numbers are used in the drawings and the description to refer to the same or like parts.

An asymmetric electrical double-layer capacitor, or asymmetric supercapacitor, uses two different mechanisms at positive and negative electrodes. The asymmetric supercapacitor may have a combination of a battery-type material and a double-layer type material. Based on the charge storage mechanism of dual carbon battery, graphitic carbon can be intercalated with cations and anions in either highly negative or positive potential range.

In some embodiments of the instant disclosure, the negative electrode is a double-layer type negative carbon electrode. The asymmetric supercapacitor stores electrostatic energy in a polarized liquid layer that forms when an electrical potential exists between the two electrodes immersed in an electrolyte (or electrolyte solution). When the electrical potential is applied across the electrodes, a double-layer of positive and negative charges is formed at the electrode-electrolyte interface (hence, the name "double-layer" capacitor) by the polarization of electrolyte ions due to charge separation under the applied electrical potential, and also due to dipole orientation and alignment of electrolyte molecules over an entire surface of the electrodes.

The double-layer type carbon has high capacitance, ranging from 50 to 370 $F/g^{-1}$. Surface area of the activated carbon is related to pore size and pore size distribution. A variety of commercially available double-layer carbon may be blended and employed so as to maximize particle-to-particle contact and lower the resistance. The double-layer type carbon may include, for example, activated carbon, graphene, N-doped graphene and the like.

The selection of the positive carbon electrode is achieved through activation threshold (AT) filtering. The activation threshold is related to the electrical property of the positive carbon material. The evaluation method and a suitable positive carbon material are elaborated hereinafter. Different carbon materials are tested and evaluated for their electrochemical property. In the evaluation, soft carbon having high amorphous/crystalline ratio, activated carbon, nanographite particles, graphite, primary synthetic graphite, meso carbon micro beads (MCMB) and conventional soft carbonre used. Soft carbon having high amorphous/crystalline ratio refers to a type of soft carbon tested by X-ray diffraction and having amorphous/crystalline peak area ratio higher than 25. For the sake of clarity, soft carbon having high amorphous/crystalline ratio is described as soft carbon hereinafter. The materials are treated by cyclic voltammetric scan and charging-discharging cycles. Their electrochemical property is analysed and elaborated hereinafter.

An electron (or hole) travels through the carbon during charging or discharging. The length of an average electron to travel to a given charge determines the internal resistance of the carbon electrode. If an electron has to travel longer the length, the resistance times capacitance (RC) time constant of the capacitor is greater. Therefore electron travelling distance interferes with the carbon-electrode capacitor's ability to be efficiently charged or discharged in a short period of time.

Different carbon materials are tested under Raman spectrum to see their in-plane length. The experiment is conducted under 532 nm wavelength between 1000-3000 $cm^{-1}$. Please refer to FIG. 1. FIG. 1 is a line graph showing results of different samples under Raman shift spectrum test. Lines 110, 120, 130 are soft carbon, line 140 is activated carbon, line 150 is nanographite particles, line 160 is graphite, line 170 is primary synthetic graphite, line 180 is MCMB and line 190 is conventional soft carbon. The in-plane length has great effect of RC time constant, and it is analysed by Raman spectroscopy. As shown in FIG. 1, lines 110, 120, 130 (i.e., soft carbon) have symmetrical peaks, which translate to relatively symmetrical D-band ($I_D$) and G-band ($I_G$) configuration. When D-band and G-band value is standardized by its ratio, as $I_D/I_G$, the results are shown in Table 1. Sample numeral corresponds to line numeral as shown in FIG. 1. It can be seen that carbon materials having higher degree of graphitisation, for example, graphite, primary synthetic graphite and MCMB has smaller $I_D/I_G$ ratio. According to the following equation:

$$C(\lambda) = -126 \text{ Å} + 0.033\lambda_L$$

$$L_a = C(I_D/I_G)^{-1}$$

The $I_D/I_G$ ratio can be converted to in-plane correlation length ($L_a$), which interferes with the internal resistance of the carbon electrode. A smaller in-plane correlation length value indicates a shorter distance an ion has to travel. Conversely, a larger in-plane correlation length suggests a longer distance an ion has to travel. Carbon materials with lower degree of graphitisation, for example, soft carbon, have lower in-plane correlation length and thus shorter distance to travel for an electron. This shorter distance allows a faster response time during charging and discharging. The results of in-plane correlation length of each sample are shown in Table 1.

TABLE 1

| Sample | $I_D/I_G$ | $L_a$ |
|---|---|---|
| 110 | 1.10 | 45.05 |
| 120 | 0.89 | 55.69 |
| 130 | 0.92 | 53.87 |
| 140 | 1.20 | 41.3 |
| 150 | 1.02 | 48.58 |
| 160 | 0.49 | 101.14 |
| 170 | 0.29 | 170.90 |
| 180 | 0.15 | 330.4 |
| 190 | 1.07 | 46.32 |

Figure 3:
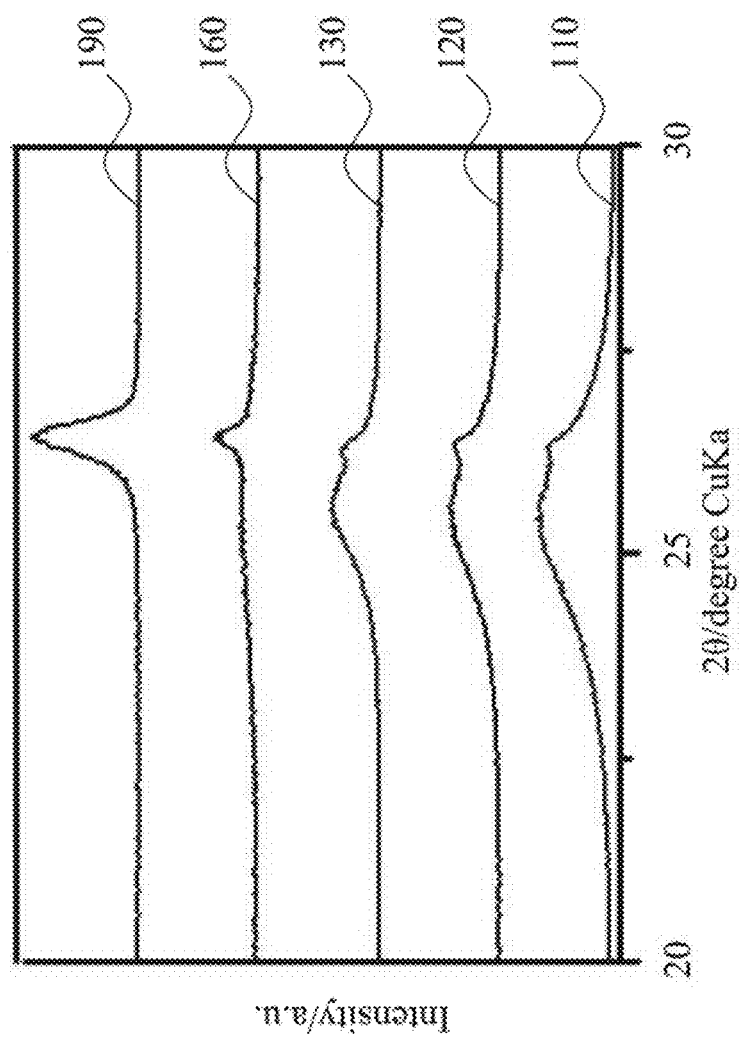
FIG. 3 is an X-ray diffraction graph showing different samples between 20° and 30°.

The amorphous and crystalline property of each carbon material are analysed by X-ray diffraction test. Please refer to FIGS. 2A-2B, illustrating different samples under 20° to 90°. Identical carbon materials are designated with the same numeral as shown in FIG. 1. In the diffraction pattern, between 20°-30°, the amorphous (broad) peaks of activated carbon 140 and nanographite particles 150 can be observed. Graphite 160, primary synthetic graphite 170 and MCMB 180, which have higher degree of graphitisation, show crystalline (narrow) peaks. Soft carbon 110, 120, 130 have dual peaks. More specifically, soft carbon 110, 120, 130 have distinct amorphous peaks between 20°-30° and slightly down the X-axis, crystalline peaks are also present between 20°-30°. Please refer to FIG. 3, illustrating an X-ray diffraction graph zooming in between 20°-30° of soft carbon, graphite and conventional soft carbon such that the amorphous and crystalline peaks between 20°-30° can be seen more clearly. Unlike graphite 160 or conventional soft carbon 190, soft carbons 110, 120, 130 have dual peaks between 20°-30°. Along the X-axis, firstly the amorphous peak is encountered and soon after the broad bump, a narrower peak, i.e., crystalline peak appears. Graphite 160 and conventional soft carbon 190 do not have the dual peak feature between 20°-30°.

Figure 4A:
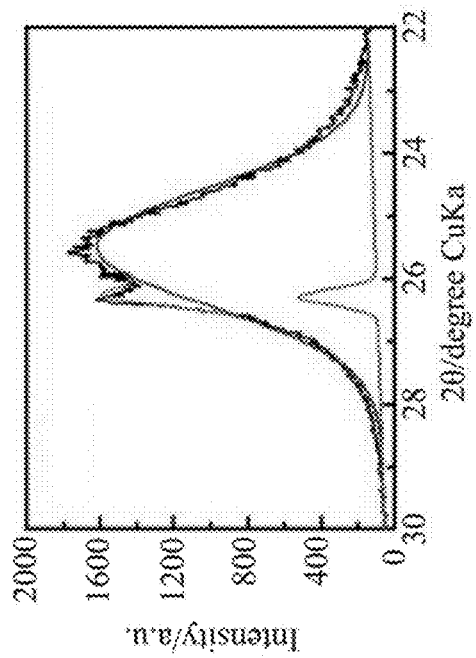
FIGS. 4A-4F are X-ray diffraction peak splitting graphs showing different samples under 20° to 30°.
Figure 4B:
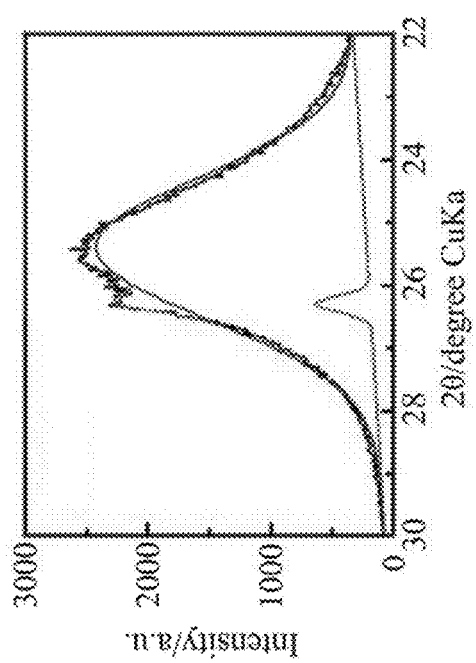
Figure 4C:
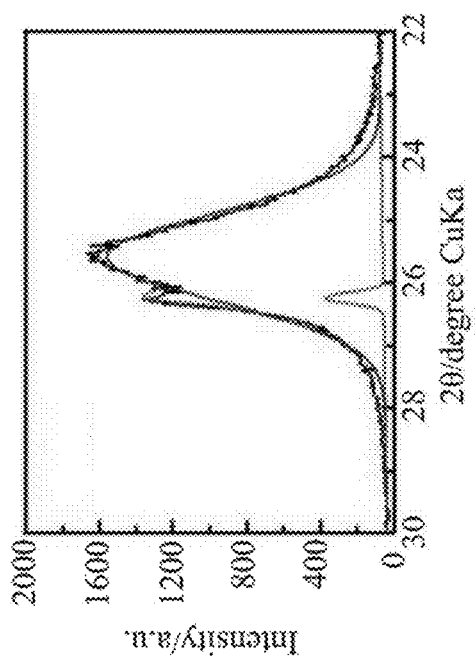
Figure 4E:
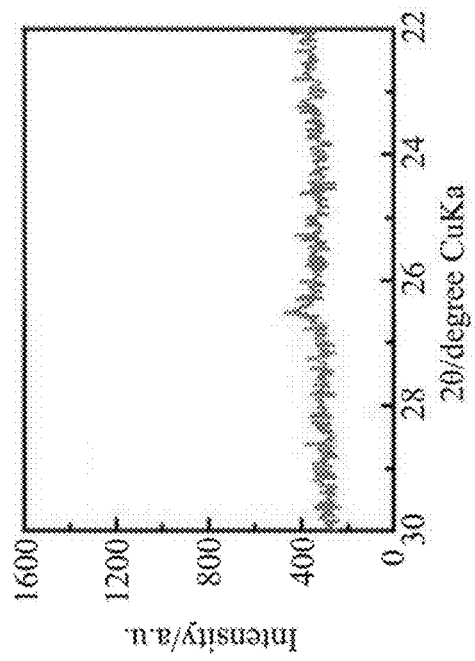
Figure 4D:
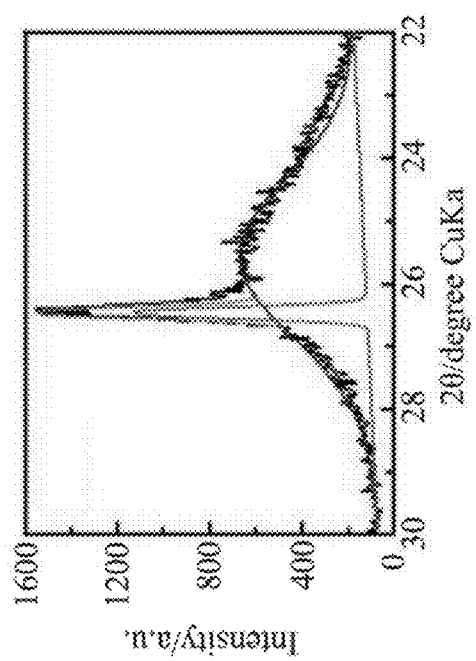
Figure 4F:
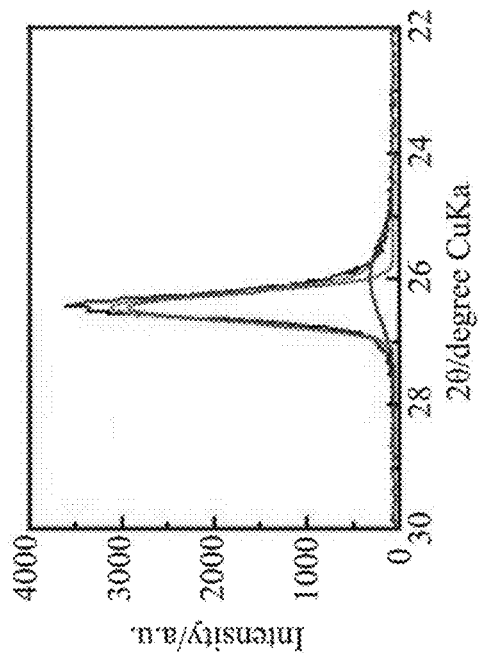

By using Gaussian distribution, the area under amorphous peak between 22°-30° of soft carbon, activated carbon, conventional soft carbon and graphite is further analysed. Please refer to FIGS. 4A-4F, illustrating the amorphous and crystalline peak area of three soft carbon, activated carbon, conventional soft carbon and graphite respectively. Each graph contains four lines, and the wiggly line represents the original data, a light grey line represents a normalized crystalline peak, a darker grey line represents a normalized amorphous peak, and an overall normalization line is also shown in the graph. Please refer to FIG. 4A, illustrating the Gaussian distribution of amorphous and crystalline peaks of soft carbon 110. The light grey line having a climb slightly over 500 is the crystalline peak. The amorphous peak of the soft carbon 110 echoes the trend of the original data line (wiggly line), while after normalization the amorphous peak has a much smoother curve. The overall normalization line is slightly difficult to spot where it follows closely with the original data line. Soft carbon 120 and 130 shown in FIG. 4B and FIG. 4C respectively have similar trend as seen in FIG. 4A. Referring to FIG. 4D, in the case of conventional soft carbon 190, the light grey line of the crystalline peaks shoots high to nearly 1200. The amorphous darker grey line goes gently to a peak at around 700 and down. Attention is now invited to FIG. 4E. The activated carbon 140 does not show distinct peaks between 22°-30°. Graphite 160 in FIG. 4F has high profile in crystalline peak to a value up to almost 3000. On the other hand, the amorphous peak of graphite is mild at a peak of less than 500.

Please refer to Table 2 in conjunction with FIGS. 4A-4F. Table 2 shows the area ratio of amorphous peak against crystalline peak ($A_{amorphous}/A_{crystalline}$, $A_a/A_c$) of the carbon materials. Values from activated carbon and nanographite particles are not available because of the absence of distinct peak in the data.

TABLE 2

| Sample | $A_{amorphous}/A_{crystalline}$ ($A_a/A_c$) |
|---|---|
| 110 | 43.78 |
| 120 | 25.82 |
| 130 | 37.72 |
| 140 | N/A |
| 150 | N/A |
| 160 | 0.25 |
| 170 | 0.22 |
| 180 | 1.32 |
| 190 | 7.97 |

The in-plane correlation length and area ratio of amorphous peak against crystalline peak of the carbon materials are evaluated, and the role of electrochemical activation is further studied.

The electrochemical activation involves cyclic voltammetric scan and charging-discharging cycles. Detail process and test results are elaborated hereinafter. Before treatment, carbon materials are first tested by cyclic voltammetric scan and charging-discharging cycle. In some embodiments, the cyclic voltammetric scan cycle and the charging-discharging cycle can be performed in succession. In some embodiments, the cyclic voltammetric scan cycle and the charging-discharging cycle are conducted as two separate, different approaches to treat the carbon material.

The initial cyclic voltammetric scan test is conducted under −0.6 to 2V under 25 mV/s. The results of each carbon materials 110 through 190 are shown in FIGS. 5A-5C and 6A-6D respectively. The darker grey line represents the test result before any electrochemical activation treatment. After the initial test, carbon materials are allowed to rest to normal state and then undergo electrochemical activation through cyclic voltammetric scan three times between −0.6 and 2.2V under approximately 25 mV/s. After the cyclic voltammetric scan treatment, the carbon materials go through cyclic voltammetric scan again. The result of cyclic voltammetric scan after electrochemical activation is shown as lighter grey line in the graph.

Figure 5A:
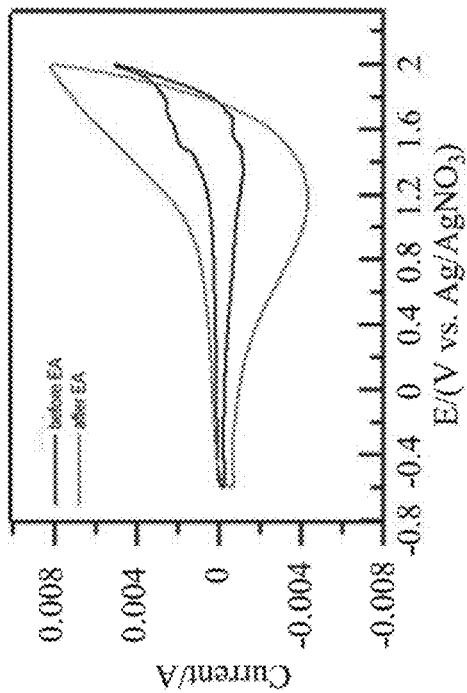
FIGS. 5A-5C are graphs showing before and after cyclic voltammetric scan cycle of soft carbon respectively.
Figure 5B:
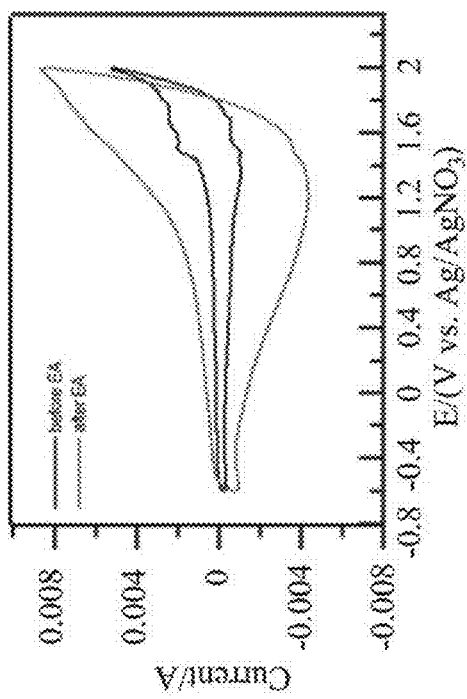
Figure 5C:
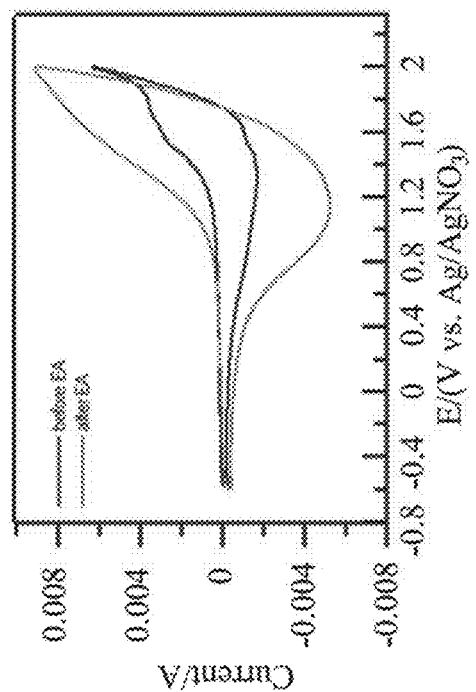

Please refer to FIG. 5A, illustrating soft carbon 110 potential status before and after treatment. After electrochemical activation, the current range expands greatly compared to non-treated soft carbon 110. It suggests that cyclic voltammetric scan cycle activates the soft carbon 110 because the potential limit increases significantly. Similarly, soft carbon 120 and 130 show much larger potential range after electrochemical activation treatment as shown in FIGS. 5B and 5C.

Figure 6A:
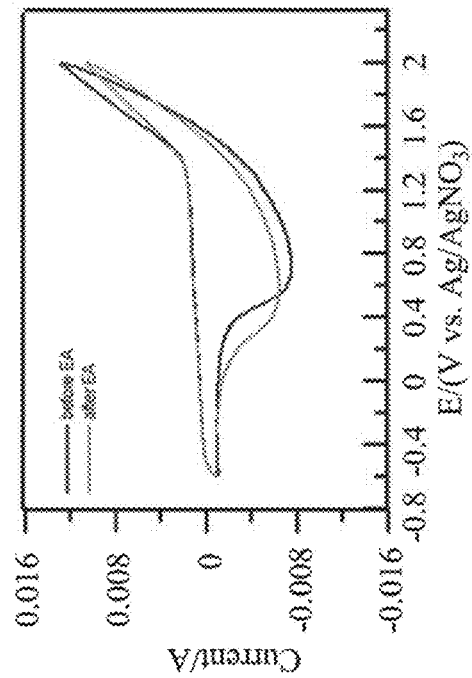
FIGS. 6A-6D are graphs showing before and after cyclic voltammetric scan cycle of primary synthetic graphite, graphite, MCMB and soft carbon respectively.
Figure 6B:
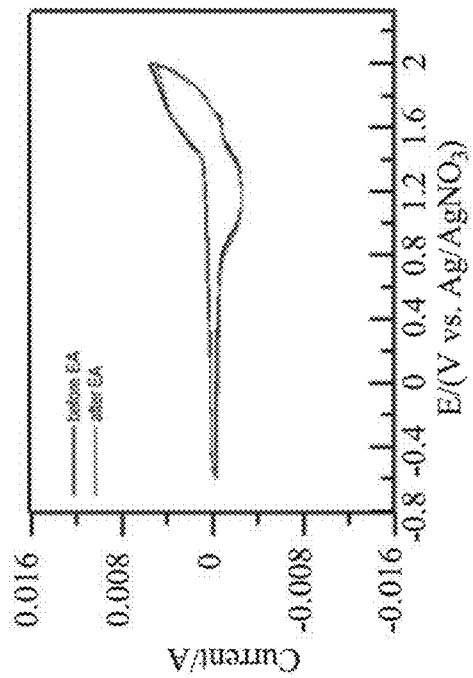
Figure 6C:
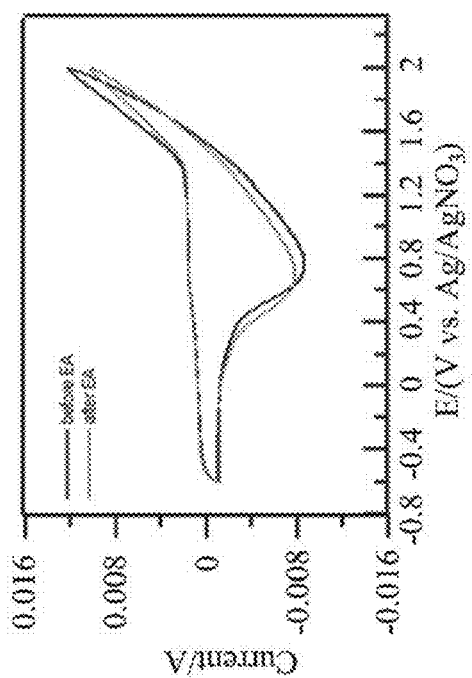
Figure 6D:
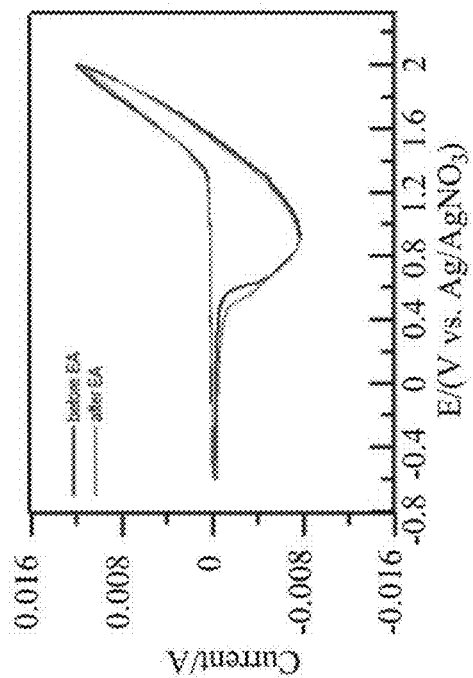
Figure 9A:
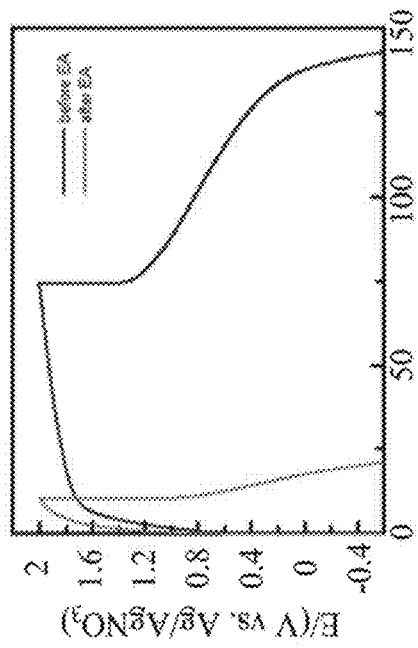
FIGS. 9A-9D are before and after charging-discharging at 1 A/g line graphs of primary synthetic graphite, graphite, MCMB and soft carbon respectively.
Figure 9B:
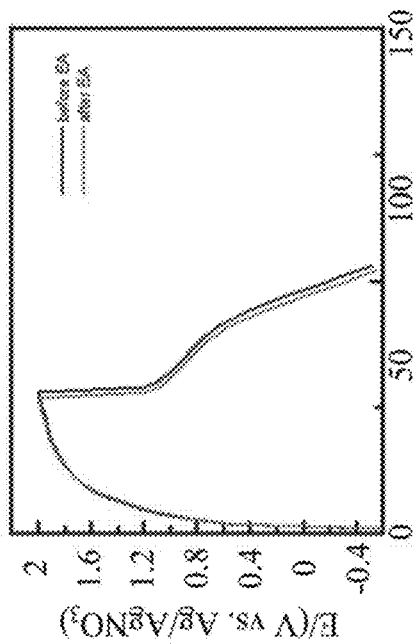
Figure 9C:
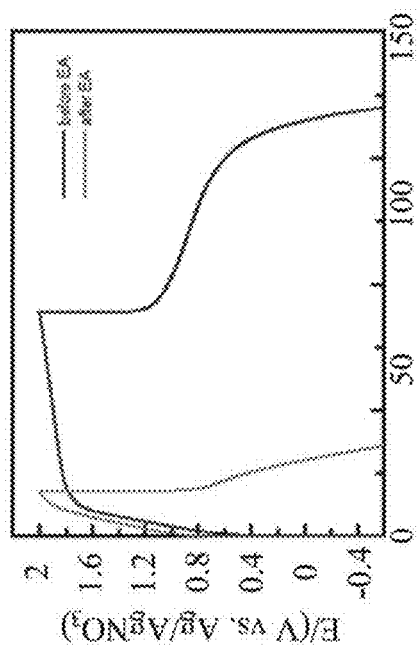
Figure 9D:
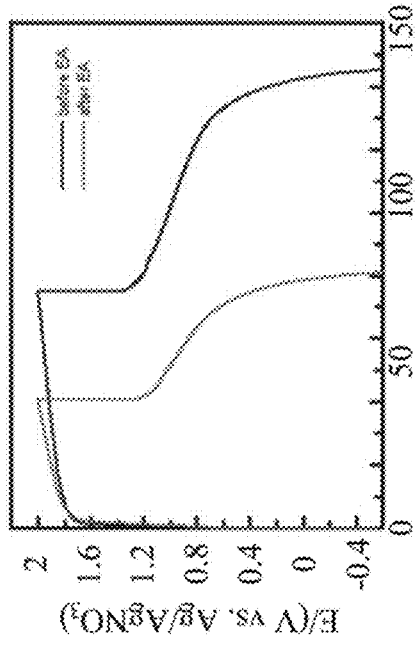

Cyclic voltammetric scan cycle has adverse effect to primary synthetic graphite 170 and graphite 160 as shown in FIGS. 6A and 6B respectively. After the treatment, these two carbon materials show irreversible coupling. In the case of MCMB 180 and soft carbon 190, FIGS. 6C and 6D respectively, the electrochemical activation treatment does not have notable effect to the potential coupling. The operable potential of activated carbon and nanographite particles is lower than 2 V, and this potential results in electrolyte dissolution. As a result, as shown in FIG. 7, after the cyclic voltammetric scan cycle treatment, nanographite particles 150 shows clearly irreversible coupling at 1.8 V. This irreversible coupling cannot be eliminated by high potential at 2 V, and furthermore the potential range did not expand.

The carbon materials are tested by charging-discharging cycle at 1 A/g under −0.6 to 2 V. As shown in FIGS. 8A-8C and 9A-9D, the capacitance value before treatment is shown as darker grey line in the graph. The carbon materials are allowed to rest and then undergo electrochemical activation through charging-discharging cycle for at least three times. The capacitance value after treatment is shown as lighter grey line.

Attention is now invited to FIG. 8A, illustrating the capacitance capacity of soft carbon 110 before and after charging-discharging cycle treatment. After three times of charging-discharging cycle, the soft carbon 110 has higher capacitance. The curve shifts from right along the X-axis after electrochemical activation. The same result is observed in soft carbon 120 and 130 shown in FIGS. 8B-8C, after the charging-discharging cycle treatment. The activation caused by charging-discharging cycle to the soft carbon is at least 50% more after the treatment takes place. Primary synthetic graphite 170, graphite 160 and MCMB 180, shown in FIGS. 9A-9C respectively, do not show promising results as that of the soft carbon after charging-discharging cycle. Instead, the capacitance greatly reduces for these three carbon materials after the treatment. For conventional soft carbon 190, the charging-discharging cycle treatment does not have marked shift after electrochemical activation treatment. The detail capacitance value before and after charging-discharging cycle treatment is shown in Table 3. The ratio of capacitance before and after electrochemical activation is deduced and shown in the last column in Table 3. Activated carbon 140 and nanographite particles 150 are omitted in Table 3 because they are not suitable carbon material for electrochemical activation.

TABLE 3

| Sample | Specific capacitance before EA (SC$_b$) F/g | Specific capacitance after EA (SC$_a$) F/g | SC$_b$/SC$_a$ (%) |
|---|---|---|---|
| 110 | 13.50 | 20.28 | 50 |
| 120 | 10.85 | 18.23 | 68 |
| 130 | 10.88 | 24.15 | 122 |
| 160 | 26.38 | 4.15 | −26 |
| 170 | 31.23 | 6.81 | −78 |
| 180 | 13.54 | 7.69 | 43 |
| 190 | 0.96 | 0.96 | 0 |

According to the electrochemical activation test result, an activation threshold equation can be derived from the in-plane correlation length and area ratio of amorphous against crystalline peaks. The activation threshold equation is shown as following:

$$AT = L_a * (A_d/A_c)$$

A suitable positive carbon electrode material should exhibit at least 50% of capacitance elevation after electrochemical activation treatment, including cyclic voltammetric scan and/or charging-discharging cycles. The elevation of capacitance translates into the activation threshold (AT) in the equation. In order to achieve higher capacitance, the activation threshold should be no less than 1400. That is, when multiplying in-plane correlation length and the area ratio of amorphous and crystalline peaks, if the resulting value, i.e., the activation threshold, is smaller than 1400, the carbon material is not suitable as a positive carbon electrode in the asymmetric supercapacitor. If the activation threshold is larger than 1400, it suggests the carbon material exhibits the desirable electrochemical property. The desirable electrochemical property means that after electrochemical activation by cyclic voltammetric scan and/or charging-discharging cycles, the carbon material has broader potential range and elevated capacitance to a great extent. The activation threshold equation is applied to evaluate the carbon materials, and the results are shown in Table 4.

TABLE 4

| Sample | L$_a$ | A$_{amorphous}$/A$_{crystalline}$ (A$_d$/A$_c$) | Value |
|---|---|---|---|
| 110 | 45.05 | 43.78 | 1972.29 |
| 120 | 55.69 | 25.82 | 1437.92 |
| 130 | 53.87 | 37.72 | 2031.98 |
| 140 | 41.3 | N/A | N/A |
| 150 | 48.58 | N/A | N/A |
| 160 | 101.14 | 0.25 | 25.29 |
| 170 | 170.90 | 0.22 | 37.60 |
| 180 | 330.4 | 1.37 | 436.13 |
| 190 | 46.32 | 7.97 | 369.17 |

According to Table 4, soft carbon 110, 120, 130 have activation threshold ranging between approximately 1430 and 2035. This value suggests that soft carbon is a suitable positive carbon electrode in the asymmetric supercapacitor because of its capacity in potential and capacitance expanding. MCMB 180 has an activation threshold of approximately 440, and it suggests that MCMB is not suitable as a positive carbon electrode in the asymmetric supercapacitor because its potential and capacitance do not have the capacity to expand after the electrochemical activation. The activation threshold value in Table 4 should be evaluated in conjunction with the test results of cyclic voltammetric scan and charging-discharging cycles as shown in the figures. The carbon materials having activation threshold smaller than 1400 do not show electrical property enhancement after electrochemical activation, while the carbon materials having activation threshold higher than 1400 show promising electrical property and are suitable as positive carbon electrode in the asymmetric supercapacitor.

In addition to the selection of positive and negative carbon electrodes, a separator and electrolyte are also required for an asymmetric supercapacitor. The positive and negative electrodes are isolated from electrical contact by a separator. The separator and the electrodes are immersed in an electrolyte solution, allowing ionic current (ionic flow) to flow between the electrodes through the separator, and at the same time the separator prevents an electrical or electronic (as opposed to an ionic) current from shorting the two electrodes. Coupled to the back of each of the electrodes is typically a current collecting plate. The current collecting plate may also serve another purpose: reduce ohmic loss, i.e., internal resistant in the asymmetric supercapacitor. Commercially available organic liquid electrolytes can be used in the asymmetric supercapacitor system. In some embodiments, the electrolyte is a combination of tetraethylammonium tetrafluoroborate (TEABF$_4$) and propylene carbonate (PC). Alternatively, TEABF$_4$ can be mixed with acetonitrile and serving as the electrolyte.

In some embodiment, the asymmetric supercapacitor uses double-layer type carbon as the negative electrode and a carbon material having activation threshold higher than 1400 as the positive electrode. In an embodiment, the positive electrode is soft carbon because it exhibits a promising activation threshold that implies expandable potential and capacitance.

Conventional carbon-electrode capacitor performance may be limited by its high internal resistance related to the material itself. This high internal resistance results from many factors and translates to large ohmic loss in the capacitor during charging and discharging. The instant disclosure provides an asymmetric supercapacitor employing two different mechanisms at the positive and negative electrodes. The negative electrode is a double-layer type carbon, while the positive electrode is a carbon material having an activation threshold higher than 1400. The asymmetric supercapacitor shows lower internal resistance because of the positive carbon electrode being electrochemically activated by cyclic voltammetric scan and/or charging-discharging cycles. It is found that a carbon material having an activation threshold higher than 1400 responses to the electrochemical activation. In other words, the potential range and capacitance of these carbons are expandable. Therefore, the asymmetric supercapacitor of the instant disclosure has higher power storage capacity and faster response in charging and discharging cycle.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An asymmetric supercapacitor, comprising:
    a negative electrode made of a first carbon;
    a positive electrode made of a treated soft carbon;

a separator disposed in between the negative and positive electrodes; and an electrolyte;

wherein the treated soft carbon has an activation threshold (AT) larger than 1400, and the activation threshold (AT) is obtained from the following formula:

$$AT = L_a * (A_a/A_c)$$

$L_a$ is an in-plane correlation length of the treated soft carbon, $A_a$ is an area of amorphous peak of the treated soft carbon analysed by X-ray diffraction in Gaussian distribution graph, and $A_c$ is an area of crystalline peak of the treated soft carbon analysed by X-ray diffraction in Gaussian distribution graph.

2. The asymmetric supercapacitor of claim 1, wherein the treated soft carbon is treated by electrochemical activation.

3. The asymmetric supercapacitor of claim 2, wherein the electrochemical activation includes cyclic voltammetric scan and charging-discharging cycle.

4. The asymmetric supercapacitor of claim 1, wherein the in-plane correlation length of the treated soft carbon is derived from Raman spectroscopy under a wavelength of 532 nm.

5. The asymmetric supercapacitor of claim 1, wherein a material of the first carbon is selected from a group consisting of activated carbon, graphene, N-doped graphene.

6. The asymmetric supercapacitor of claim 1, wherein the electrolyte is $TEABF_4$ in propylene carbonate.

* * * * *